US009613358B1

(12) United States Patent
Gardner

(10) Patent No.: US 9,613,358 B1
(45) Date of Patent: Apr. 4, 2017

(54) SYSTEM, METHOD, AND COMPUTER PROGRAM FOR CAPTURING A UNIQUE IDENTIFIER FOR A MERCHANT USED IN PURCHASE TRANSACTION APPROVAL REQUESTS

(71) Applicant: Marqeta, Inc., Emeryville, CA (US)

(72) Inventor: Jason M. Gardner, Oakland, CA (US)

(73) Assignee: Marqeta, Inc., Oakland, CA (US)

( * ) Notice: Subject to any disclaimer, the term of this patent is extended or adjusted under 35 U.S.C. 154(b) by 0 days.

(21) Appl. No.: 13/970,530

(22) Filed: Aug. 19, 2013

(51) Int. Cl.
G06Q 20/40 (2012.01)

(52) U.S. Cl.
CPC ................ G06Q 20/4097 (2013.01)

(58) Field of Classification Search
None
See application file for complete search history.

(56) References Cited

U.S. PATENT DOCUMENTS

| | | | |
|---|---|---|---|
| 6,044,360 A | 3/2000 | Picciallo | |
| 6,931,382 B2 | 8/2005 | Laage et al. | |
| 7,664,405 B2 | 2/2010 | Paulson | |
| 7,664,705 B2 | 2/2010 | Walker et al. | |
| 8,191,766 B2 * | 6/2012 | Tomchek et al. | 235/376 |
| 8,249,985 B2 | 8/2012 | Giordano et al. | |
| 8,290,866 B1 | 10/2012 | Little | |
| 8,341,076 B1 | 12/2012 | Wilkes | |
| 8,447,670 B1 | 5/2013 | DeLoach | |
| 8,626,642 B2 | 1/2014 | Foss et al. | |
| 8,635,117 B1 | 1/2014 | Acuna-Rohter | |

| | | |
|---|---|---|
| 2002/0002485 A1 | 1/2002 | O'Brien et al. |
| 2002/0073045 A1 | 6/2002 | Rubin et al. |
| 2002/0169720 A1 | 11/2002 | Wilson et al. |
| 2004/0186773 A1 | 9/2004 | George et al. |
| 2006/0078099 A1 | 4/2006 | Liebenow et al. |
| 2006/0190412 A1 | 8/2006 | Ostroff |

(Continued)

FOREIGN PATENT DOCUMENTS

| | | |
|---|---|---|
| WO | 0141026 | 6/2001 |
| WO | 02097752 | 12/2002 |

OTHER PUBLICATIONS

Li, Yingjiu, et al., "A Security-Enhanced One-Time Payment Scheme for Credit Card", Mar. 2004.

*Primary Examiner* — Robert R Niquette
*Assistant Examiner* — Joseph W King
(74) *Attorney, Agent, or Firm* — Lessani Law Group, PC

(57) ABSTRACT

A system, method, and computer program are provided for capturing a unique identifier for a merchant used in purchase transaction approval requests. A merchant is able to register with a payment card system via a merchant interface. A payment card number is associated with and provided to the merchant via the interface with instructions to perform a purchase transaction with the payment card number. The system receives requests for approval of payment card transactions, where each request includes a payment card number and a unique identifier for a merchant. For each request, the system determines whether the payment card number includes an indicator that the payment card number is for the purpose of capturing a unique identifier for a merchant. In response to receiving a request with a payment card number that includes the indicator, a unique identifier accompanying the request is automatically associated with the registering merchant.

18 Claims, 9 Drawing Sheets

(56) References Cited

U.S. PATENT DOCUMENTS

| | | |
|---|---|---|
| 2006/0212407 A1 | 9/2006 | Lyon |
| 2006/0224454 A1 | 10/2006 | Kantor et al. |
| 2007/0112655 A1 | 5/2007 | Jones |
| 2007/0284436 A1 | 12/2007 | Gland |
| 2008/0077506 A1 | 3/2008 | Rampell et al. |
| 2008/0208747 A1 | 8/2008 | Papismedov et al. |
| 2009/0078755 A1 | 3/2009 | Sullivan et al. |
| 2009/0164382 A1 | 6/2009 | Sally |
| 2009/0299841 A1 | 12/2009 | Bishop et al. |
| 2010/0049599 A1 | 2/2010 | Owen et al. |
| 2010/0057580 A1 | 3/2010 | Raghunathan |
| 2010/0094699 A1 | 4/2010 | Beal |
| 2010/0301113 A1 | 12/2010 | Bohn et al. |
| 2010/0312629 A1 | 12/2010 | Wolf et al. |
| 2011/0047038 A1 | 2/2011 | Halevi |
| 2012/0130787 A1 | 5/2012 | Stouffer et al. |
| 2012/0215605 A1 | 8/2012 | Gardner et al. |
| 2012/0253852 A1 | 10/2012 | Pourfallah et al. |
| 2012/0330840 A1 | 12/2012 | Stinchcombe |
| 2013/0065564 A1 | 3/2013 | Conner et al. |
| 2013/0262307 A1* | 10/2013 | Fasoli et al. .................... 705/44 |
| 2013/0282565 A1* | 10/2013 | Barta et al. ..................... 705/39 |
| 2013/0290184 A1 | 10/2013 | Shapiro et al. |
| 2014/0040129 A1 | 2/2014 | Akin |

\* cited by examiner

SYSTEM, METHOD, AND COMPUTER PROGRAM FOR CAPTURING A UNIQUE IDENTIFIER FOR A MERCHANT USED IN PURCHASE TRANSACTION APPROVAL REQUESTS

BACKGROUND OF THE INVENTION

1. Field of the Invention

This invention relates generally to a payment card system and, more particularly, to a system and method for capturing a unique identifier for a merchant used in purchase transaction approval requests.

2. Description of the Background Art

Whether a customer is shopping in a brick and mortar merchant location or visiting an online retailer, he is likely to use a credit card, debit card, gift card, or other payment card in order to complete a purchase transaction. When a customer attempts to use a payment card for a purchase at a merchant, the payment card number (e.g., credit card number), purchase amount, and one or more unique identifiers for the merchant are sent, via a merchant processor (e.g., an acquiring bank), to the issuing bank or other entity responsible for approving/declining transactions for the card. These identifiers typically include a merchant ID (MID) and/or a terminal ID (TID), which are assigned to merchants and terminals, respectively by a merchant processor. Issuing banks maintain merchant databases that map merchants to their respects MIDs and TIDs so that they identify the merchant for purposes of fraud detection, marketing, customer analysis, etc. As the issuing banks that approve/decline transactions are usually not the entities that assign MIDs and TIDs to merchants, discrepancies between the MIDs/TIDs in the issuing banks' databases and the MIDs/TIDs currently used by corresponding merchants often arise. They typically occur when a merchant switches merchant processors, moves a credit card terminal to a different location, opens a new location, etc. In a typical credit card transaction, while a correct MID or TID is ideal, it is not critical. For example, in the case where a customer uses a credit card to make a purchase, the issuing bank primarily decides whether to authorize the transaction based on whether the credit card holder has sufficient credit for the purchase, not based on the identity of the merchant.

International Application No. PCT/US2012/25932, filed on Feb. 21, 2012 and titled "System and Method for Providing a User with a Single Payment Card on which Prepaid and/or Reward Balances Are Tracked for Multiple Merchants," which is incorporated herein by reference in its entirety, describes a system and method in which multiple merchant purses are associated with a user's account (which may be associated with a physical or electronic card). Each purse corresponds to one merchant, and represents the user's credit balance with the merchant (e.g., prepaid deposits plus rewards). The balance associated with each merchant purse is separately tracked.

In this situation where there are multiple merchant credits associated with the same account, it is critical that the purchase transaction be settled with the correct merchant and, therefore, it is necessary for the payment card processor to be able to correctly identify the merchant sending the purchase authorization request. For example, if the payment card processor cannot identify the merchant or maps the MID in the authorization request to the wrong merchant, the transaction would either be denied or the system would debit the wrong merchant purse. If a customer is constantly denied approval of a purchase request due to a discrepancy in the MID and/or other merchant identifying information, the customer has an unsatisfactory experience with the payment card. Therefore, there is a need for enabling a payment card processing system to automatically capture the MID and/or other unique identifiers for a merchant used in purchase transaction approval requests.

SUMMARY OF THE INVENTION

The present invention is directed to a system, method, and computer program for capturing one or more unique identifiers (e.g., a merchant ID (MID), a merchant name, a merchant address, latitude and longitude, store number, terminal ID (TID), etc.) for a merchant used in purchase transaction approval requests. A merchant is able to register with a payment card system by entering a merchant name in a merchant interface. In response to a merchant initiating registration with the payment card system, a payment card number is associated with the merchant and provided to the merchant via the merchant interface with instructions to perform a purchase transaction with the payment card number. The payment card number includes an indicator (e.g., one or more numbers immediately following the BIN or IIN in a payment card number) that indicates that the payment card number is for the purpose of capturing a unique identifier of a merchant.

The payment card system (or a system that processes payment card transaction for the payment card system) regularly receives requests for approval of payment card transactions (also referred to herein as "purchase authorization requests" or "authorization requests"), where each request includes a payment card number and a unique identifier for a merchant. For each request received, the system determines whether the payment card number associated with the request includes the indicator indicating that the payment card is for the purpose of capturing a unique identifier for a merchant. In response to receiving a request with a payment card number that includes the indicator, one or more unique identifiers for the merchant within the request is automatically associated with the registering merchant previously associated with the payment card number. This enables the system to recognize such unique identifier (s) in future authorization requests from the registering merchant.

In certain embodiments, the instructions to the registering merchant to perform a purchase transaction also include a specified purchase transaction amount. In response to receiving a request for approval of a purchase transaction with a payment card number that includes the indicator, one or more unique identifiers accompanying the request is only associated with the merchant previously associated with the payment card number if a purchase amount in the request matches the specified purchase transaction amount provided to the merchant.

In certain embodiments, after associating a unique identifier with a registering merchant, the system uses the unique identifier to look up the merchant in a database. The system then compares information about the merchant in the database to information entered by the merchant in the merchant interface during registration. In response to identifying a disparity between the information in the database and the information entered by the merchant during registration, the system updates the database to match the information entered by the merchant during registration.

The present invention also provides an improved method for handling transactions including unknown MIDs. In certain embodiments, when a payment card processing system receives a MID it does not recognize, it determines if other merchant information (e.g., latitude and longitude, store ID, TID, merchant name, etc.) accompanying the authorization request matches known information about a registered merchant, where such known information has been confirmed a threshold number of times. If the only difference between certain merchant information in the current authorization request and a threshold number of previously valid authorization requests received from the merchant is the MID, the system assumes that merchant has changed its MID and approves the transaction if the account holder has sufficient funds or credit in his account for the transaction.

DETAILED DESCRIPTION OF THE PREFERRED EMBODIMENTS

The present invention is directed to a system, method, and computer program for capturing a unique identifier for a merchant used in purchase transaction approval requests. As used herein, a payment card processing system is any system within a payment card network that processes requests for approval of purchase transactions using a payment card, such as a payment card issuer (e.g., the issuing bank). The payment card system may be any system associated with the underlying bank issuing the credit card, the company marketing the card, or the company managing the card.

Figure 1:
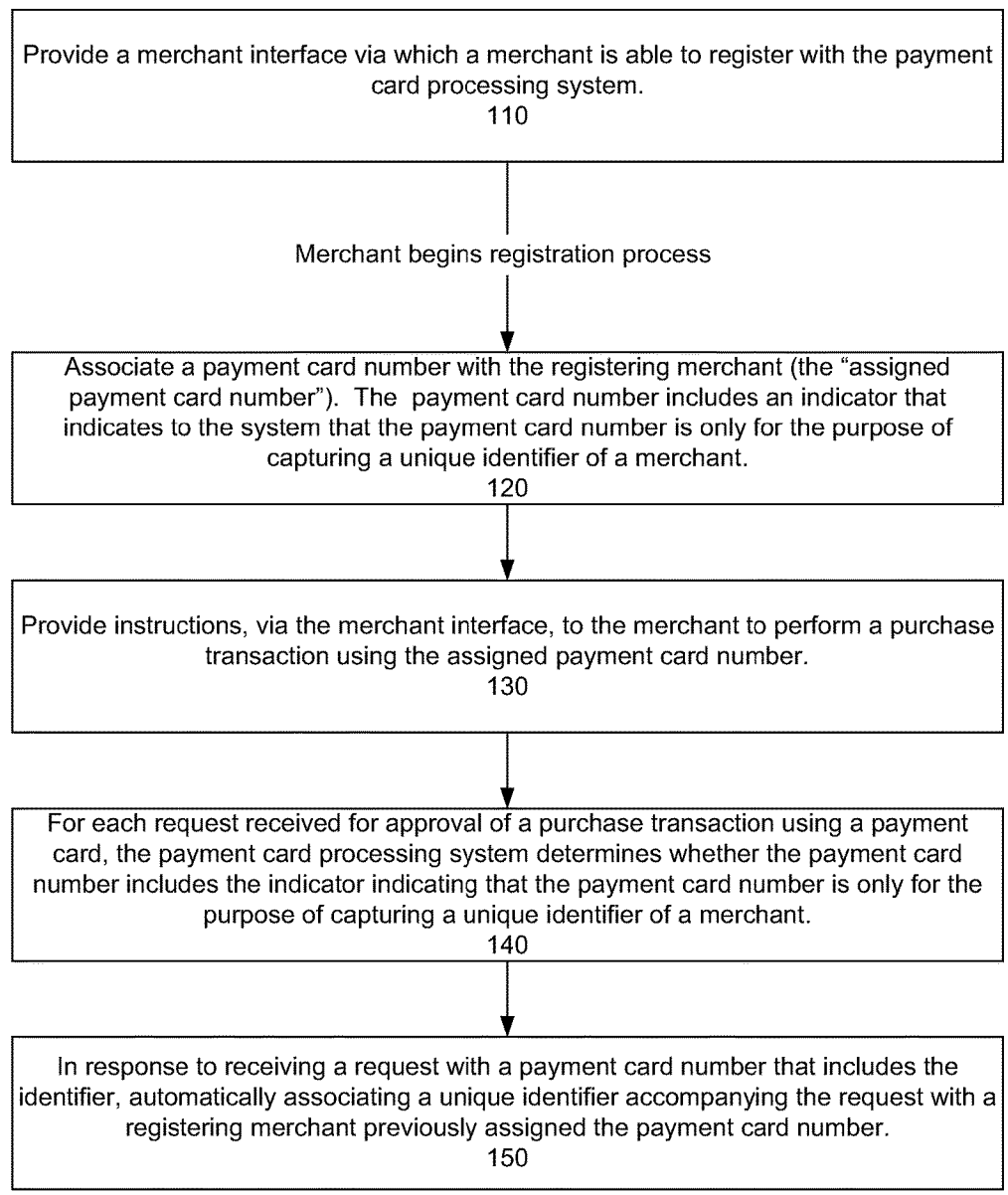
FIG. 1 is a flowchart that illustrates a method, according to one embodiment of the invention, for capturing a unique identifier for a merchant used in purchase transaction approval requests.
Figure 2A:
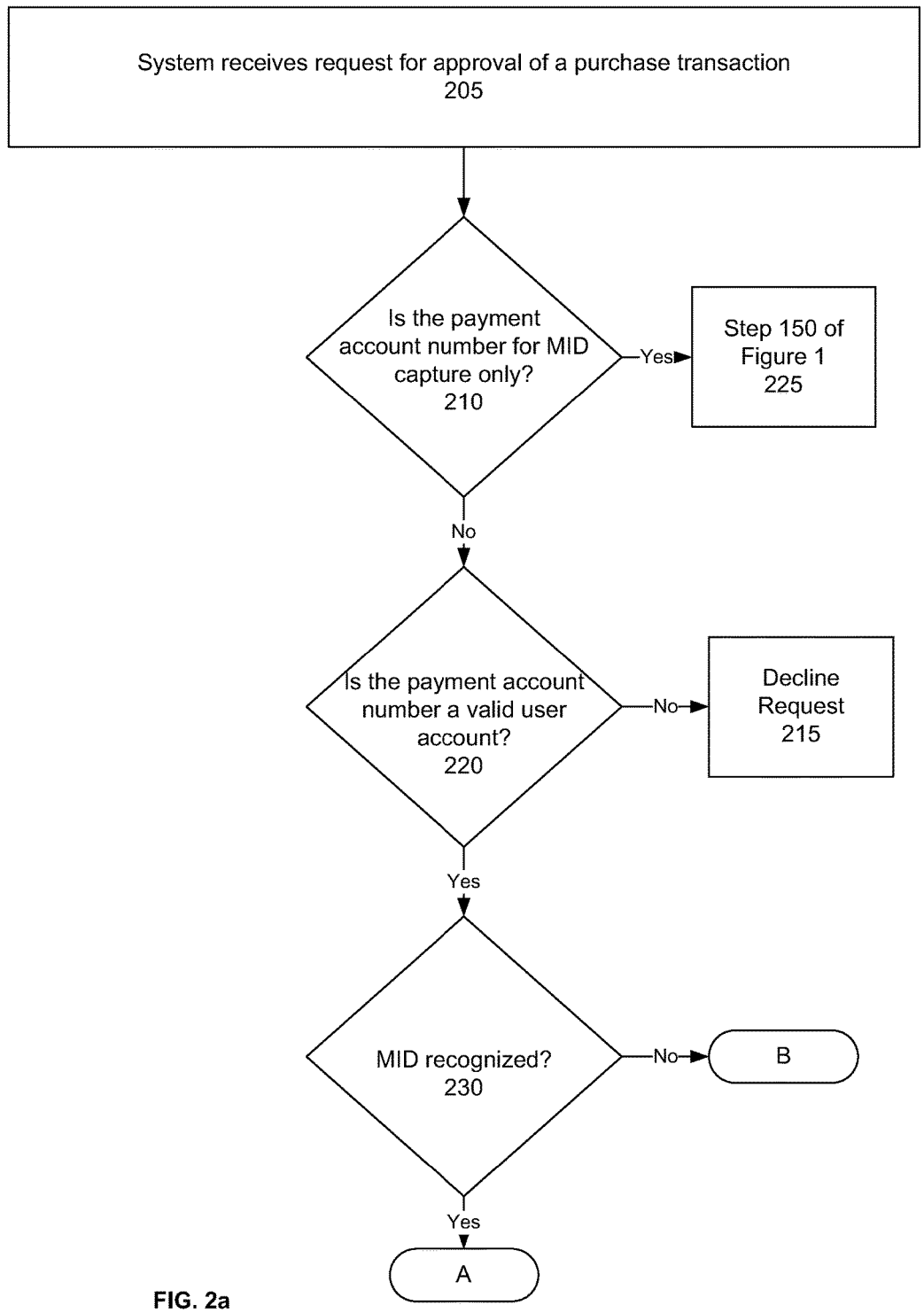
FIGS. 2a-2d is a flowchart that illustrates a process flow corresponding to one embodiment of the invention.
Figure 2B:
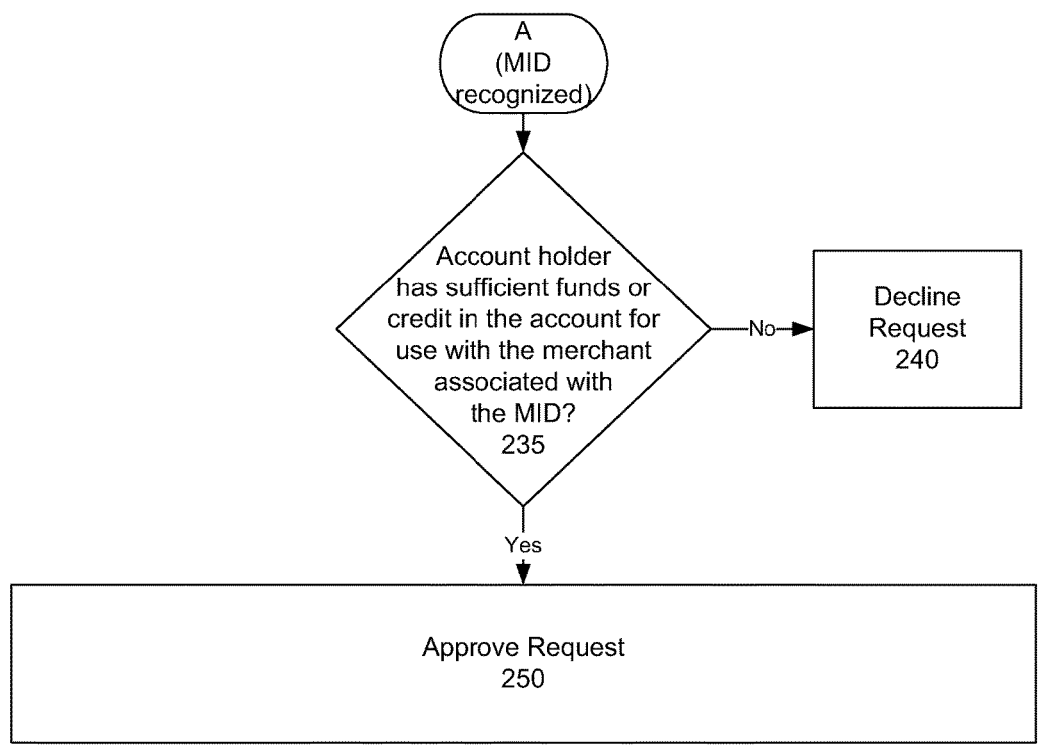
Figure 2C:
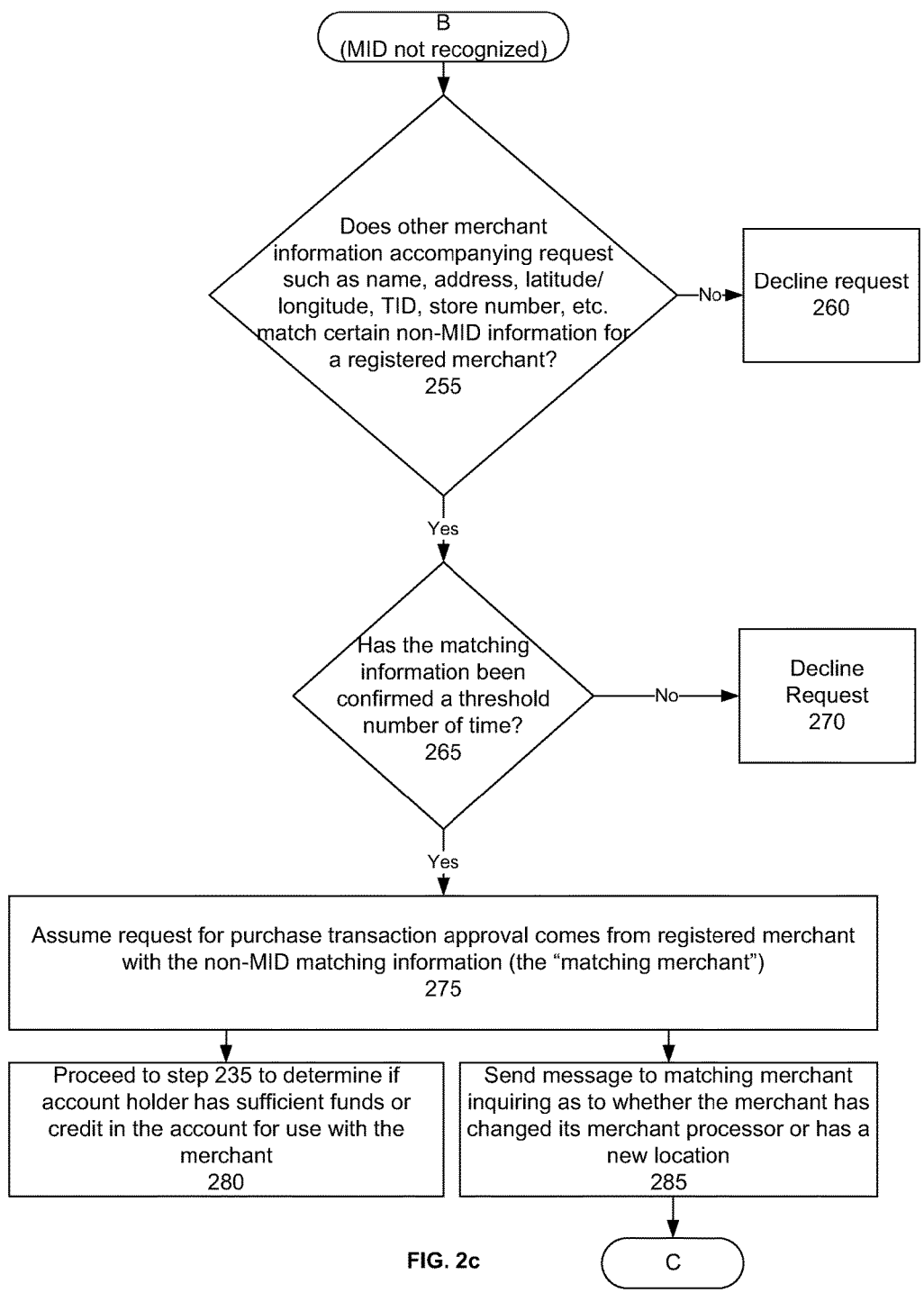
Figure 2D:
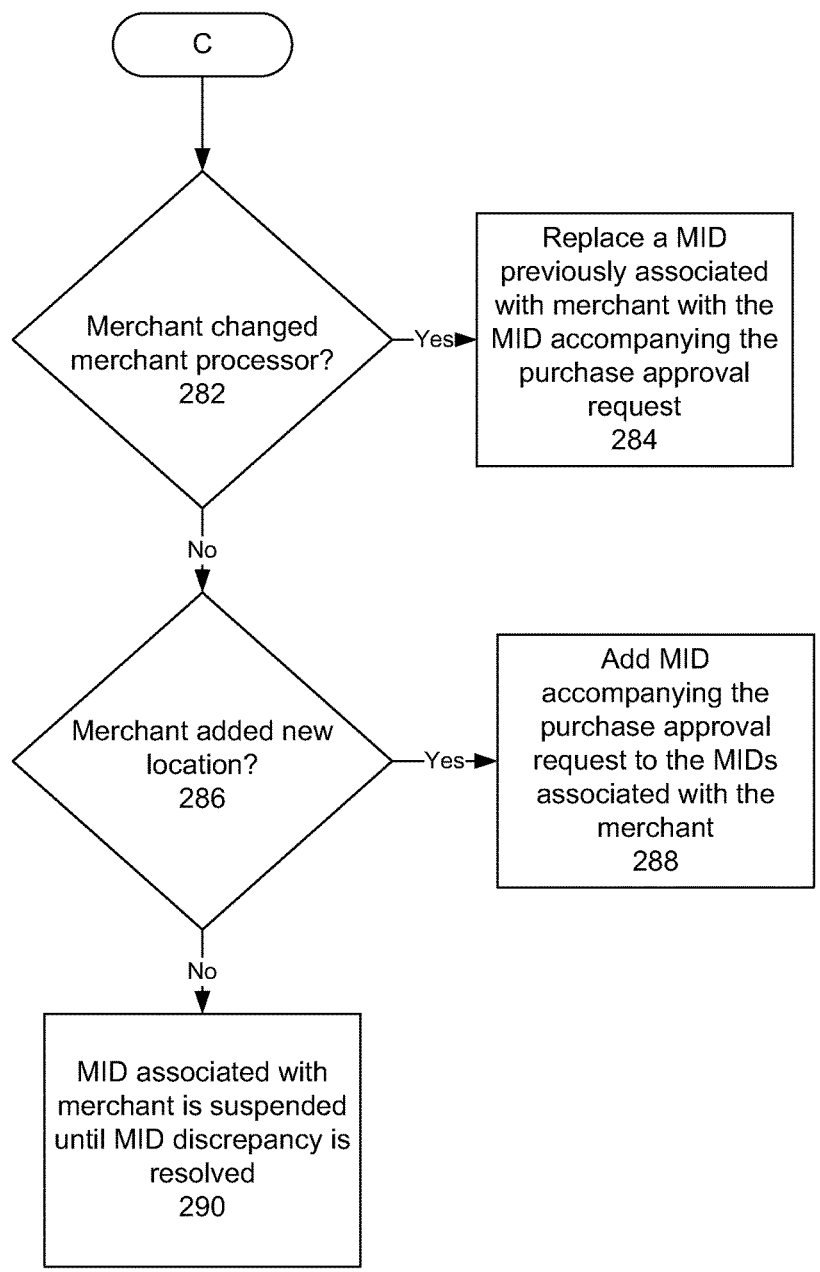

As seen in FIG. 1, a merchant interface is provided via which a merchant is able to register with the payment card system (step 110). The payment card system with which the merchant registers may be the same as the payment card processing system or it may be different system. For example, a merchant may register with the entity that is marketing the card or branding the card, but a different entity may process authorization requests and settle transactions for the payment card. Alternatively, the merchant may register with the issuing bank, and the issuing bank may also be the entity that processes authorization requests and settles transactions for the card.

The merchant begins the registration process by entering identifying information, such as, for example, the merchant name, merchant address, etc. and agreeing to terms and conditions. A payment card number is associated with the registering merchant (i.e., the "assigned payment card number") (step 120). The payment card number has the same format as an account holder's payment card number (i.e., 16 digits with the same MIN and BIN/IIN of the account holder's payment card number) and includes an indicator that indicates to the system that the payment card number is only for the purpose of capturing a merchant's unique ID. For example, in a preferred embodiment, the payment cards within the payment card system have 16 digits and are structured as follows: the first 6 digits are the BIN or IIN, the value of digits 7 and 8 indicate whether or not the payment card is for unique ID capture, digits 9-15 are random, and digit 16 is the checksum.

The payment card system provides instructions, via the merchant interface, to the merchant to perform a purchase transaction (e.g., using a nominal amount or zero) using the assigned payment card (step 130). The purchase transaction would typically be performed as a "card not present" transaction since the merchant would not have a physical card.

When the registering merchant performs a purchase transaction with the payment card number provided during the registration process, the purchase authorization request is sent to a payment card processing system (which may or may not be the same as the payment card system) that processes purchase authorization requests for the payment card. Authorization requests include a payment card number, a purchase amount, and one or more data items that uniquely identify the merchant (e.g., a MID, TID, address, latitude/longitude, etc.). For each authorization request received, the payment card processing system determines whether the payment card number in the request includes the indicator indicating that the payment card number is only for the purpose of capturing a unique identifier of a merchant (step 140). A unique identifier for a merchant may include one or more of a MID, a merchant name, a merchant address, latitude and longitude, store number, TID, enabled/disabled partial authorization, and any other unique identifier that is sent to the payment card processing system during the purchase transaction approval request.

In response to receiving a request with a payment card number that includes the indicator, the payment card processing system automatically associates one or more data items (e.g., MID, latitude/longitude, address, etc.) within the request that uniquely identify a merchant (i.e., a unique identifier) with the registering merchant previously assigned the payment card number (step 150). A person of skill in the art would understand that FIG. 1 may be applied to confirming or capturing any information about a merchant (including multiple identifiers) that typically accompanies a request for approval of a purchase transaction. The above method enables a payment card processing system to know what data to expect in authorization requests for registered merchants. Thus, even if merchant data, such as an address or MID, in the authorization request is different from data provided by the merchant during the registration process, the payment card processing system will still be able to recognize that the authorization request is from the registered merchant because the above method effectively provides a mapping between a registered merchant and merchant data in a purchase authorization request from the same merchant.

In one embodiment, the above method is used to associate a MID in an authorization request with a registered merchant. The above invention enables the payment card system to identify the MID currently being used by a registered merchant.

In certain embodiments, for an additional layer of security, the instructions to perform a purchase transaction also include a specified purchase transaction amount. In response to receiving a request for approval of a purchase transaction with a payment card number that includes the indicator, the unique identifier accompanying the request is only associated with the merchant previously associated with the payment card number if a purchase amount in the request matches the specified purchase transaction amount provided to the merchant. This embodiment is described with respect to FIGS. 5a-5b.

In certain embodiments, an authorization request includes an indication of whether or not the merchant accepts split-tender transactions. In one embodiment, when the system receives an authorization request with payment card number that is for the purpose of capturing a unique identifier for the merchant, the system also checks to see if the authorization request indicates whether or not the merchant accepts split-tender transactions. If the authorization request indicates that the merchant does not accept a split-tender transaction, the system automatically sends a message to the merchant (via email, via the registration interface, etc.) notifying the merchant that he/she/it is not currently configured to accept split-tender transactions.

In certain embodiments, after associating a unique identifier with a registering merchant, the system uses the unique identifier to look up the merchant in a database. For example, the merchant may pass the MID and merchant name/address information to a credit card company and the credit card company uses the information to update its MID database. The MID database stores MIDs in association with other merchant information (e.g., merchant name and address). In the preferred embodiment, the MID database is stored within the payment network association system. The system then compares the merchant information in the database to information entered by the merchant in the merchant interface during registration. In response to identifying a disparity between the information in the database and the information entered by the merchant during registration, the system updates the database to match the information entered by the merchant during registration.

Although the present invention may be used in any type of payment card system, the present invention is particularly useful in a prepayment card system that enables a payment cardholder to associate multiple merchant purses with the payment cardholder's account. In one embodiment of a payment card system, prepaid deposits by the account holder to the one or more merchants are held in the merchant purses, and each merchant purse in a payment cardholder's account is uniquely identified using a unique identifier captured in accordance with the method described above with respect to FIG. 1. An example of a prepayment card system is described in International Application No. PCT/US2012/25932, filed on Feb. 21, 2012 and titled "System and Method for Providing a User with a Single Payment Card on which Prepaid and/or Reward Balances Are Tracked for Multiple Merchants," which, as noted above, is incorporated herein by reference in its entirety.

With prepaid payment cards, account holders are only able to use the card for merchants for which the user has made a prepaid deposit. When a payment card processing system receives a purchase authorization request for such payment cards, the payment card processing system determines whether the authorization request is from a merchant for which the payment card holder may use the account. If a registered merchant's MID or other unique identifier changes and no notice is provided to the system, the system may erroneously decline a transaction. A further embodiment of the invention provides a method for handling authorization transactions that minimize the likelihood of such erroneous declines. FIGS. 2a-2d illustrate a process flow, according to one embodiment of the invention, for how a prepayment card processing system, that identifies merchants by MID, responds when it receives a MID that it does not recognize (i.e., when it receives an authorization request with a MID that is not associated with a registered merchant). A person of skill in the art would understand that another identifier other than a MID may be used within the context of FIGS. 2a-2d.

Referring to FIG. 2, the system receives a request for approval of a purchase transaction (step 205). The system then determines whether the payment account number is for MID capture only (step 210). If the payment account number is for MID capture only, then the MID accompanying the request is automatically associated with a registering merchant previously assigned the payment account number (step 225). If not, the system determines whether the payment account number is for a valid user account (step 220). If the payment account number is not for a valid user account, the request is declined (step 215). If it is for a valid user account, the system determines whether the MID is recognized (step 230). Specifically, the system determines whether the MID matches a MID associated with a registered merchant.

If the MID is recognized, the system determines whether the account holder has sufficient funds or credit in the account for use with the merchant associated with the MID (step 235). If there is not sufficient funds or credit in the account for use with the merchant, the request is declined (step 240), but if there is, the request is approved (step 250). In certain embodiments, this process occurs in two steps. If the MID is recognized, the system determines if the account holder has a merchant purse in the account for the merchant associated with the MID. If there is a merchant purse in the account for the merchant, the system then checks whether the merchant purse or overflow account, if any, has sufficient funds or credit for the transaction. If there are sufficient funds or credit, then the request is approved, but if there are no sufficient funds or credit, the request is declined.

If, however, the MID is not recognized, the system determines whether other merchant information accompanying the authorization request, such as name, address, latitude/longitude, TID, store number, etc., match certain non-MID information for a registered merchant (step 255). If the other information does not match, the request is declined (step 260), but if there is a match, the system determines whether the matching information has been previously confirmed a threshold number of times (step 265). The threshold number of times may be zero or more, but is preferably greater than one. In one embodiment, the matching non-MID information is considered to have been confirmed once for each previous, valid authorization request from the merchant that included the matching non-MID information. In other words, the system determines if the only difference between certain merchant data in the current authorization request and previous authorization requests is the MID. If the system does not confirm a match for a threshold number of times, the request is declined (step 270), but if it does, the system assumes that the request for the purchase transaction approval comes from a registered merchant with the non-MID matching information (the "matching merchant") (step 275).

The system then 1) proceeds to step 235 to determine if the account holder has sufficient funds or credit in the account for use with the matching merchant (step 280), and 2) sends a message (via email, text, the merchant interface/portal, etc.) to the matching merchant inquiring as to whether the merchant has changed its merchant processor or has a new location (step 285). The system may provide an interface via which the merchant can respond to the request (e.g., Merchant Portal 430 in FIG. 4). If the system determines, based on the merchants response to the message, that the merchant has changed the merchant processor (step 282), the system replaces the MID previously associated with the merchant with the MID that accompanied the purchase approval request received in step 205 (step 284). If the system determines that the merchant has added a new location (step 286), the system adds the MID accompanying the purchase approval request to the MIDs associated with the merchant (step 288). If the merchant has not added a new location, the MID associated with the merchant is suspended until the MID discrepancy is resolved (step 290).

The methods described with respect to FIGS. 1-2*d* and 5*a*-5*b* are embodied in software and performed by a computer system (comprising one or more computing devices) executing the software. A person skilled in the art would understand that a computer system has one or more memory units or other physical, computer-readable storage media for storing software instructions and one or more processors for executing the software instructions.

Figure 3:
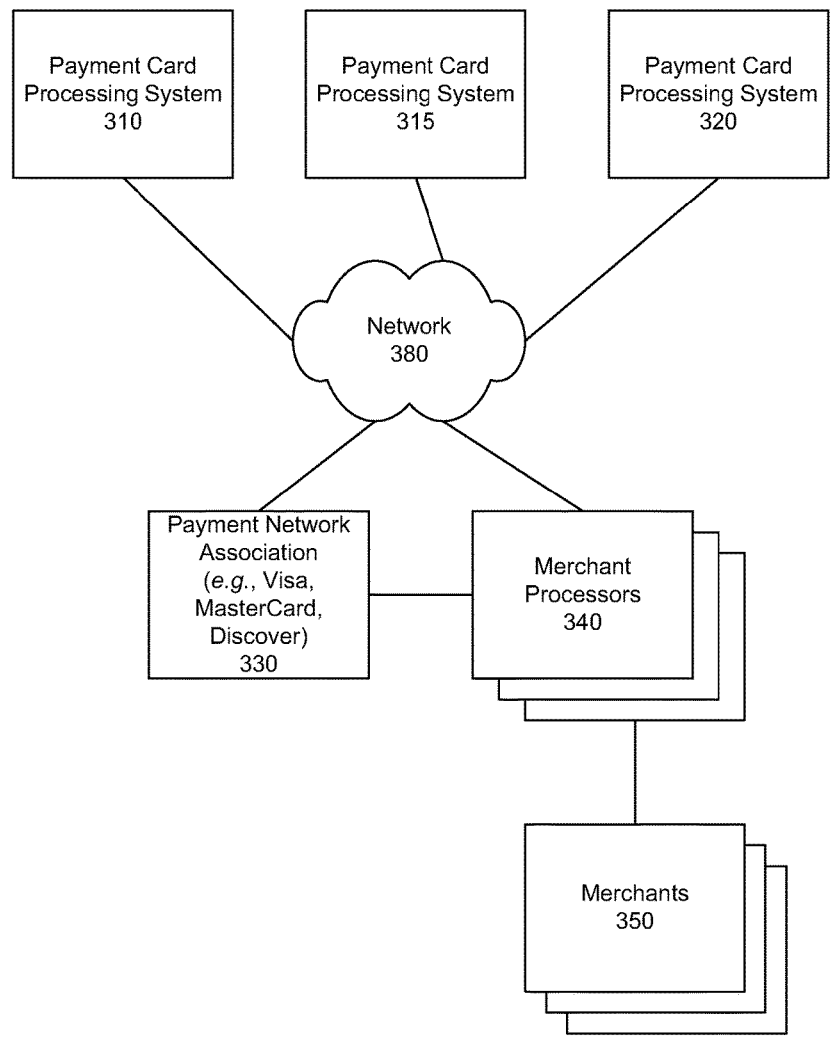
FIG. 3 is a diagram of a payment card network according to one embodiment of the invention.

FIG. 3 illustrates an example of a payment system network 300 according to one embodiment of the invention. As a person skilled in the art would understand, the system 300 may be constructed in other ways within the scope of the present invention. The methods of FIGS. 1-2*d* and 5*a*-5*b* may be implemented in other systems, and the invention is not limited to system 300.

In the preferred embodiment, the payment system network 300 includes various payment card processing systems 310, 315, 320 for processing different payment cards. These systems are usually associated with the issuing bank for the payment card (e.g., CapitalOne, Citicard, Bank of America, etc.). The payment card processing systems 310, 315, 320 are connected to a payment network association (e.g., Visa, MasterCard, Discover, etc.) 330, one or more merchant processors 340, and one or more merchants 350 via a network (e.g., a wide area network (WAN)) 380. In one embodiment, when a customer requests a purchase from a merchant 350 (e.g., swipes his card), the merchant 350 processes the request via one or more merchant processors 340 and sends the request, along with the MID, to the payment card processing system 310 to authorize the transaction. If there is credit or funds available, the payment card processing system 310 authorizes the transaction by sending an authorization code to the merchant processors 340 for completion of the purchase transaction by the merchant 350. Then, the merchant 350, via the merchant processors 340, batches together all of the purchase transactions from the day and sends them to the payment network association 330 for settling with the payment card systems 310, 315, 320.

Figure 4:
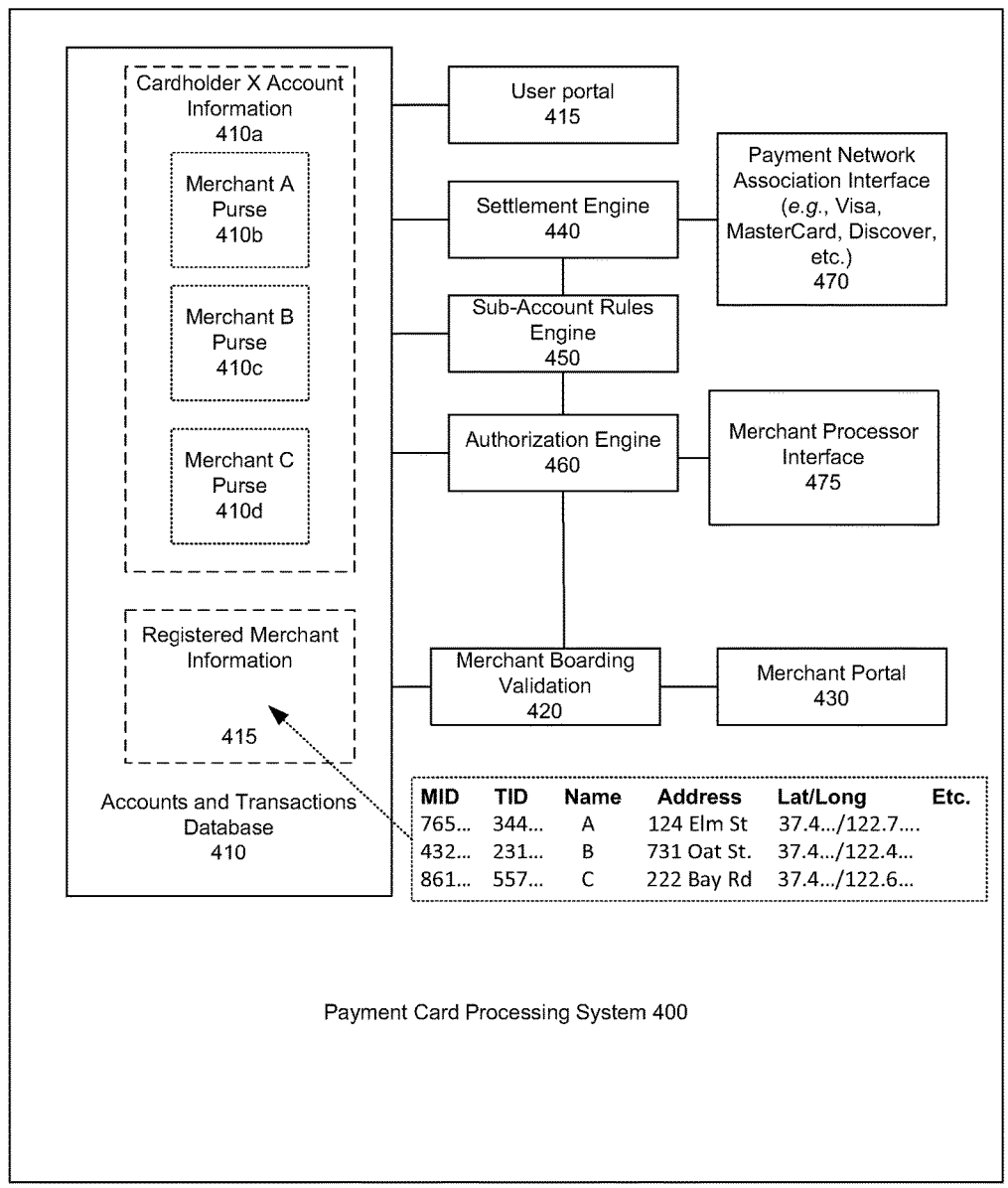
FIG. 4 is a diagram of a payment card processing system according to one embodiment of the invention.

FIG. 4 illustrates an exemplary payment card processing system 400. System 400 includes a user portal 415 (e.g., a web-based application or a dedicated application) that allows basic payment card functionality and management of merchant relationships. Via the user portal 415, a user can check balances of each individual merchant purse on a payment card associated with the user's account, view recent transactions, exchange prepayment credits with other users, view and accept new deal offers from merchants, and/or share information via social networks. The user portal 415 is also the avenue for a user to activate a card before initial use at a brick and mortar merchant or an online merchant.

System 400 includes a Merchant Boarding Validation Module 420 that validates merchant MIDs, TIDs, and other information in accordance with the method described with respect to FIG. 1.

System 400 includes a Merchant Portal 430 (e.g., a web-based application or a dedicated application) via which a merchant can register, as well as create and manage deals and campaigns. The Merchant Portal 430 provides the interface via which the merchant registers with System 400, as described with respect to FIG. 1. In one embodiment, the Merchant Portal 430 also includes various reporting tools to enable a merchant to see information related to various campaigns and deals.

System 400 includes an Accounts and Transactions Database 410. The database stores information on each account holder 410*a*. Each account may have one or more purses associated with the account. For example, for Cardholder X's account, there are three purses associated with the account: Merchant A Purse 410*b*, Merchant B Purse 410*c*, and Merchant C Purse 410*d*. A person skilled in the art would understand that there may be more or less purses associated with an account within the scope of the present invention. Each merchant purse may have one or more sub-accounts that are used to manage the accounting when a user attempts to purchase a product/service using the user account. For example, a purse funds sub-account may specify available purse funds, as well as various bank/institution transaction fees that accrue when the prepayment card is used to make a purchase. Another sub-account may track prepaid and rewards dollars including committed (but unfunded) merchant reward dollar amounts and funded merchant reward dollar amounts. The Accounts and Transactions Database 410 also includes Registered Merchant Information 415, which is merchant information obtained during the registration process and during the process described with respect to FIG. 1. As depicted in the accompanying table, the Registered Merchant Information 415 may include the MID, TID, Name, Address, Latitude/Longitude, etc. of each registered merchant.

System 400 includes an Authorization Engine 460 that processes account purchases. The Authorization Engine 460 traverses Database 410 to determine whether or not a user has sufficient funds, or an overflow account, in an applicable merchant purse to complete a purchase from the merchant using the account. Authorization Engine 460 interfaces with the merchant processor by means of a Merchant Processor Interface 475.

System 400 also includes a Sub-Account Rules Engine 450 that applies sub-accounting rules to the merchant purses within Database 410. The sub-accounting rules define how rewards are calculated and which funds in the subaccounts (e.g., prepaid funds vs. reward funds) are used to settle a transaction. System 400 also includes a Settlement Engine 440 that manages the settlement and funding of transactions. System 400 includes a Payment Network Association Interface 470 via which transaction data (e.g., sales draft information) from merchants is provided to settle transactions.

Figure 5A:
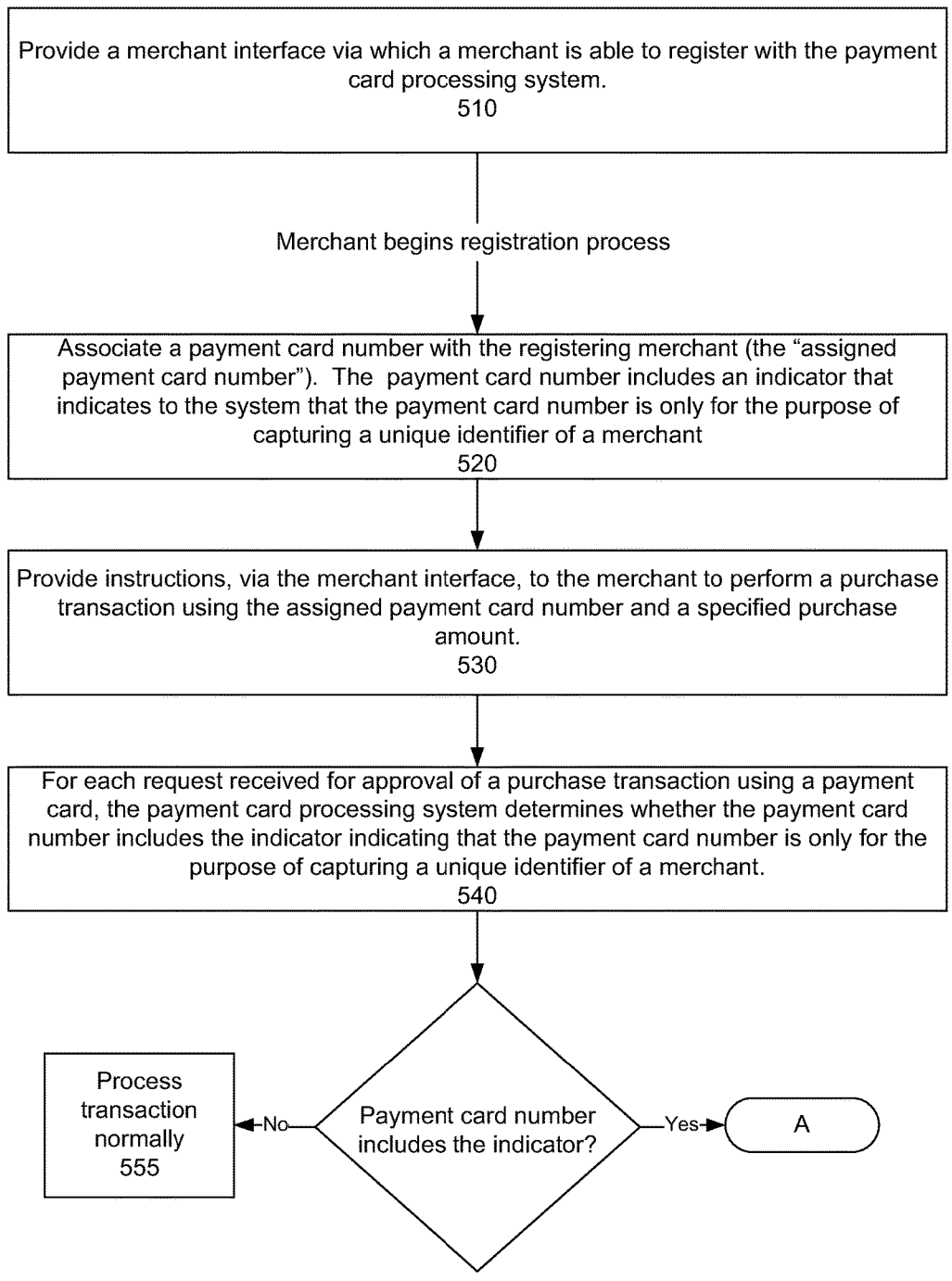
FIGS. 5a-5b are a flowchart that illustrates a method, according to an alternate embodiment of the invention, for capturing a unique identifier for a merchant used in purchase transaction approval requests.
Figure 5B:
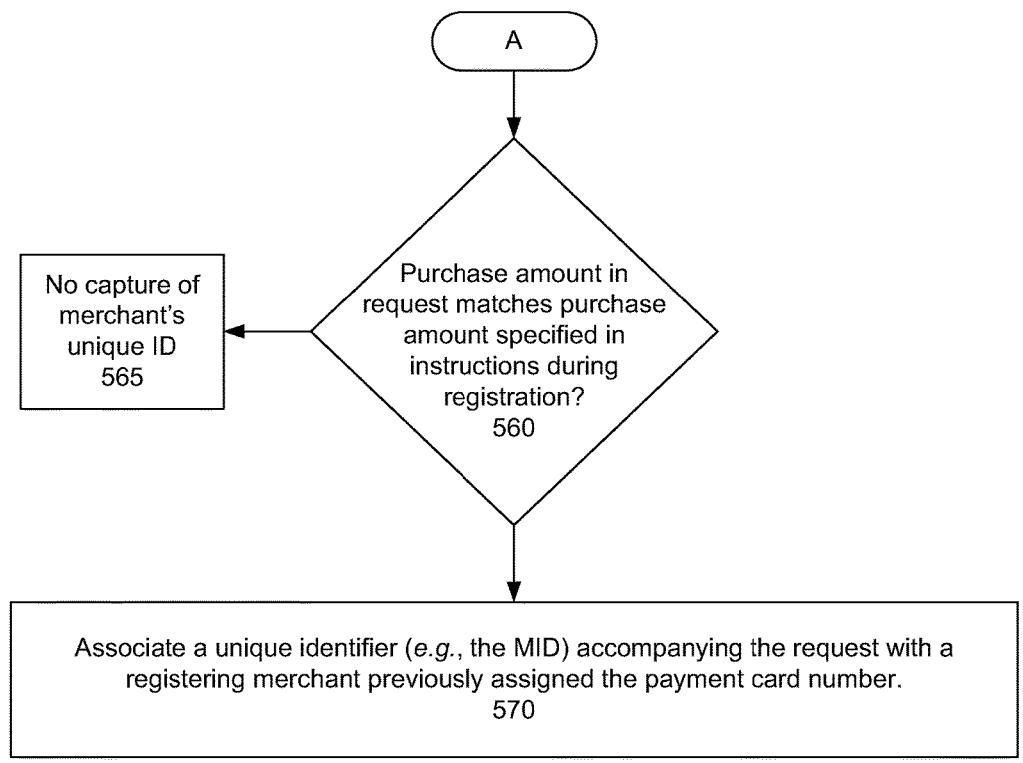

FIGS. 5*a*-5*b* illustrate an alternate embodiment of the invention. A merchant interface is provided via which a merchant is able to register with the payment card processing system (step 510). The merchant begins the registration process. A payment card number is associated with the registering merchant (i.e., the "assigned payment card number") (step 520). The payment card number includes an indicator that indicates to the system that the payment card number is only for the purpose of capturing a unique identifier for a merchant. The payment card processing system provides instructions, via the merchant interface, to the merchant to perform a purchase transaction using the assigned payment card number and a specified purchase amount (step 530).

For each request received for approval of a purchase transaction using a payment card, the payment card processing system determines whether the payment card number includes the indicator indicating that the payment card number is only for the purpose of capturing a unique identifier of a merchant (step 540). If the payment card number does not include the indicator, the transaction is processed normally (step 555). In response to receiving a request with a payment card number that includes the identifier, the system determines whether the purchase amount in the request matches the purchase amount specified in the instructions during registration (step 560). If the purchase amount in the request does not match the purchase amount specified in the instructions, the merchant's unique ID is not captured (step 565). If there is a match, the system associates a unique identifier (e.g., the MID) accompanying the request with a registering merchant previously assigned the payment card number (step 570).

As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

The invention claimed is:

1. An automated method, performed by a payment card system, for capturing a unique identifier for a merchant used in purchase transaction approval requests, the method comprising:
  providing a merchant interface via which a merchant is able to register with the payment card system, wherein the merchant enters a merchant name in the interface in registering;
  in response to a merchant initiating registration with the payment card system, associating a payment card number with the merchant and providing the payment card number to the merchant via the merchant interface with instructions for the merchant to perform a purchase transaction with the payment card number in order to capture a unique identifier of the merchant, wherein the payment card number includes an indicator that indicates to the payment card system that the payment card number is for the purpose of capturing a unique identifier of a merchant, wherein the unique identifier is a merchant's MID;
  receiving at the payment card system one or more requests for approval of payment card transactions, wherein each request includes a payment card number and a MID for a merchant;
  for each such request received, determining whether a respective payment card number associated with the request includes the indicator that indicates to the payment card system that the respective payment card number is for the purpose of capturing a MID for a merchant;
  in response to receiving a request, among the one or more requests for approval, having a payment card number that includes the indicator, automatically associating a MID accompanying the request with a merchant previously associated with the payment card number;
  in response to receiving a request, among one or more requests for approval, having a payment card number that does not include the indicator and having a MID that does not match a MID of a registered merchant, determining whether other merchant information accompanying the request matches information, including name and address information, previously stored in association with a registered merchant;
  in response to the other merchant information in the request matching information previously associated with a registered merchant, determining whether the matching information has been confirmed for the registered merchant a threshold number of times;
  in response to the matching information being confirmed the threshold number of times, approving the transaction request if there are sufficient funds or credit for the transaction for use with the matching registered merchant in an account of a payment card holder associated with the transaction, and sending a message to the matching registered merchant inquiring as to whether the merchant has changed its merchant processor or added a new merchant location; and
  in response to the matching information not being confirmed a threshold number of times, declining the transaction.

2. The method of claim 1, wherein a MID associated with a merchant in response to receiving a payment card with the indicator is used to uniquely identify merchant purses for the merchant in payment cardholders' accounts.

3. The method of claim 1, wherein the instructions to perform a purchase transaction also include a specified purchase transaction amount, and wherein, in response to receiving a request for approval of a purchase transaction with a payment card number that includes the indicator, a MID accompanying the request is only associated with the merchant previously associated with the payment card number if a purchase amount in the request matches the specified purchase transaction amount provided to the merchant.

4. The method of claim 1, wherein the other merchant information includes longitude and latitude information for a merchant.

5. The method of claim 1, wherein, in response to the matching registered merchant indicating that it has changed its merchant processor, replacing the MID previously associated with the matching registered merchant with the MID accompanying the request.

6. The method of claim 1, wherein, in response to the matching registered merchant indicating that it has added a new location, adding the MID accompanying the request to the MIDs associated with the matching registered merchant.

7. The method of claim 1, further comprising:
  after associating a MID with a registering merchant, using said MID to look up the merchant in a MID database;
  comparing information about the merchant in the MID database to information entered by the merchant in the merchant interface during registration; and
  in response to identifying a disparity between the information in the MID database and the information entered by the merchant during registration, updating the MID database to match the information entered by the merchant during registration.

8. The method of claim 1, wherein the indicator is one or more numbers immediately following the BIN or IIN in a payment card number.

9. The method of claim 1, wherein the request for approval of a purchase transaction also indicates whether or not the merchant accepts split-tender transactions and wherein the method further comprises:
  in response to the request indicating that the merchant associated with the request does not accept split-tender transactions, notifying the merchant that the merchant is not currently configured to accept split-tender transactions.

10. A payment card system for capturing a unique identifier for a merchant used in purchase transaction approval requests, the payment card system comprising:
  one or more processors;

one or more memory units coupled to the one or more processors, wherein the one or more memory units store instructions that, when executed by the one or more processors, cause the payment card system to perform the operations of:

provinding a merchant interface via which a merchant is able to register with the payment card system, wherein the merchant enters a merchant name in the interface in registering;

in response to a merchant initiating registration with the payment card system, associating a payment card number with the merchant and providing the payment card number to the merchant via the merchant interface with instructions for the merchant to perform a purchase transaction with the payment card number in order to capture a unique identifier for the merchant, wherein the payment card number includes an indicator that indicates to the payment card system that the payment card number is for the purpose of capturing a unique identifier of a merchant, wherein the unique identifier is a merchant's MID;

receiving at the payment card system one or more requests for approval of payment card transactions, wherein each request includes a payment card number and a MID for a merchant;

for each such request received, determining whether a respective payment card number associated with the request includes the indicator that indicates to the payment card system that the respective payment card number is for the purpose of capturing a MID for a merchant;

in response to receiving a request, among the one or more requests for approval, having a payment card number that includes the indicator, automatically associating a MID accompanying the request with a merchant previously associated with the payment card number;

in response to receiving a request, among one or more requests for approval, having a payment card number that does not include the indicator and having a MID that does not match a MID of a registered merchant, determining whether other merchant information accompanying the request matches information, including name and address information, previously stored in association with a registered merchant;

in response to the other merchant information in the request matching information previously associated with a registered merchant, determining whether the matching information has been confirmed for the registered merchant a threshold number of times;

in response to the matching information being confirmed the threshold number of times, approving the transaction request if there are sufficient funds or credit for the transaction for use with the matching registered merchant in an account of a payment cardholder associated with the transaction, and sending a message to the matching registered merchant inquiring as to whether the merchant has changed its merchant processor or added a new merchant location; and in response to the matching information not being confirmed a threshold number of times, declining the transaction.

11. One or more non-transitory computer-readable media comprising computer program code that when executed by a payment card system enables the payment card system to perform the following method for capturing a unique identifier for a merchant used in purchase transaction approval requests, the method comprising:

providing a merchant interface via which a merchant is able to register with the payment card system, wherein the merchant enters a merchant name in the interface in registering;

in response to a merchant initiating registration with the payment card system, associating a payment card number with the merchant and providing the payment card number to the merchant via the merchant interface with instructions for the merchant to perform a purchase transaction with the payment card number in order to capture a unique identifier of the merchant, wherein the payment card number includes an indicator that indicates to the payment card system that the payment card number is for the purpose of capturing a unique identifier of a merchant, wherein the unique identifier is a merchant's MID;

receiving at the payment card system one or more requests for approval of payment card transactions, wherein each request includes a payment card number and a MID for a merchant;

for each such request received, determining whether a respective payment card number associated with the request includes the indicator that indicates to the payment card system that the respective payment card number is for the purpose of capturing a MID for a merchant;

in response to receiving a request, among the one or more requests for approval, having a payment card number that includes the indicator, automatically associating a MID accompanying the request with a registering merchant previously associated with the payment card number;

in response to receiving a request, among the one or more requests for approval, having a payment card number that does not include the indicator and having a MID that does not match, a MID of a registered merchant, determining whether other merchant information accompanying the request matches information, including name and address information, previously stored in association with a registered merchant;

in response to the other merchant information in the request matching information previously associated with a registered merchant, determining whether the matching information has been confirmed for the registered merchant a threshold number of times;

in response to the matching information being confirmed the threshold number of times, approving the transaction request if there are sufficient funds or credit for the transaction for use with the matching registered merchant in an account of a payment cardholder associated with the transaction, and sending a message to the matching registered merchant inquiring as to whether the merchant has changed its merchant processor or added a new merchant location; and in response to the matching information not being confirmed a threshold number of times, declining the transaction.

12. The one or more non-transitory computer-readable media of claim 11, wherein the MID associated with a merchant in response to receiving a payment card with the indicator is used to uniquely identify merchant purses for the merchant in payment cardholders' accounts.

13. The one or more non-transitory computer-readable media of claim 11, wherein the instructions to perform a purchase transaction also include a specified purchase transaction amount, and wherein, in response to receiving a request for approval of a purchase transaction with a payment card number that includes the indicator, the MID accompanying the request is only associated with the merchant previously associated with the payment card number if a purchase amount in the request matches the specified purchase transaction amount provided to the merchant.

14. The one or more non-transitory computer-readable media of claim 11, wherein the other merchant information includes longitude and latitude information for a merchant.

15. The one or more non-transitory computer-readable media of claim 11, wherein, in response to the matching registered merchant indicating that it has changed its merchant processor, replacing the MID previously associated with the matching registered merchant with the MID accompanying the request.

16. The one or more non-transitory computer-readable media of claim 11, wherein, in response to the matching registered merchant indicating that it has added a new location, adding the MID accompanying the request to the MIDs associated with the matching registered merchant.

17. The one or more non-transitory computer-readable media of claim 11, wherein the method further comprises:
   after associating a MID with a registering merchant, using said MID to look up the merchant in a MID database;
   comparing information about the merchant in the MID database to information entered by the merchant in the merchant interface during registration; and
   in response to identifying a disparity between the information in the MID database and the information entered by the merchant during registration, updating the MID database to match the information entered by the merchant during registration.

18. The one or more non-transitory computer-readable media of claim 11, wherein the request for approval of a purchase transaction also indicates whether or not the merchant accepts split-tender transactions and wherein the method further comprises:
   in response to the request indicating that the merchant associated with the request does not accept split-tender transactions, notifying the merchant that the merchant is not currently configured to accept split-tender transactions.

* * * * *